(No Model.)
L. IMPERATORI & C. BÜLOWIUS.
NUT LOCK.
No. 246,393. Patented Aug. 30, 1881.
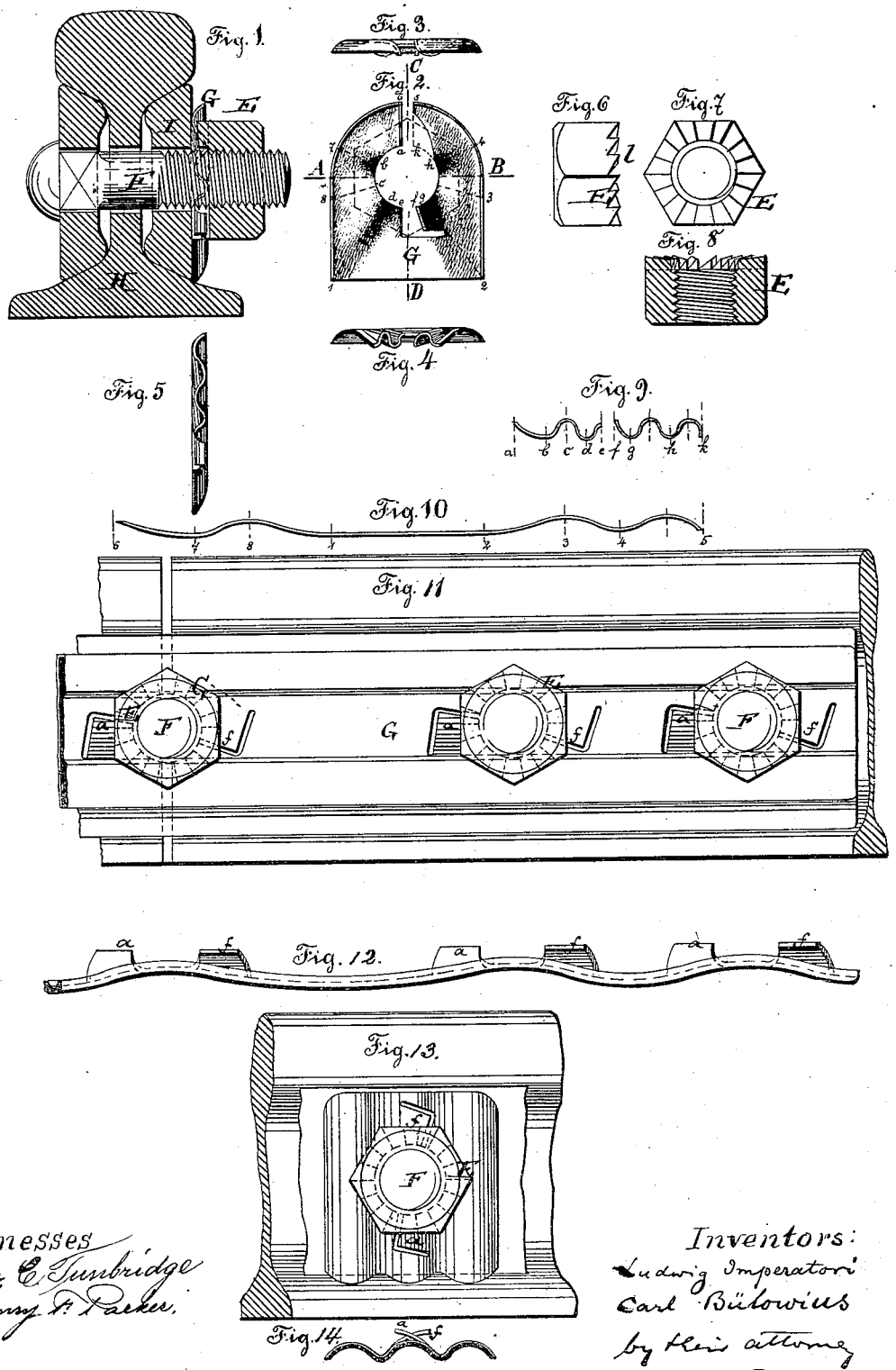

UNITED STATES PATENT OFFICE.

LUDWIG IMPERATORI, OF MILAN, ITALY, AND CARL BÜLOWIUS, OF BOCHUM, PRUSSIA, GERMANY.

NUT-LOCK.

SPECIFICATION forming part of Letters Patent No. 246,393, dated August 30, 1881.

Application filed May 12, 1881. (No model.) Patented in Belgium March 29, 1881.

*To all whom it may concern:*

Be it known that we, LUDWIG IMPERATORI, of Milan, in the Kingdom of Italy, and CARL BÜLOWIUS, of Bochum, in the Kingdom of Prussia and Empire of Germany, have invented an improved Nut-Lock, for which we have obtained Letters Patent for the Kingdom of Belgium for twenty years from the 29th day of March, 1881, and of which the following is a specification.

Figure 1 is a vertical cross-section through a rail, showing the fish-plate held by our improved nut-lock. Fig. 2 is a face view of the undulating and springy washer used in our improved nut-lock. Fig. 3 is a top view of said washer; Fig. 4, a horizontal section of the same on the line A B, Fig. 2; Fig. 5, a vertical section thereof on the line C D, Fig. 2. Fig. 6 is a side view of the nut; Fig. 7, an inner-end view of the nut, and Fig. 8, a central section through the same. Fig. 9 is a diagram showing the inner edge of the washer as it would appear if straightened or laid in a horizontal plane, and Fig. 10 is a diagram showing the outer edge of the washer similarly unfolded into a horizontal plane. Fig. 11 is a face view of a rail having our improved nut-lock in modified form. Fig 12 is a top view of the washer shown in Fig. 11; Fig. 13, a face view of another modified form of washer; Fig. 14, an edge view or top view of the washer shown in Fig. 13.

This invention relates to a new nut-lock, which consists of a pronged or toothed and corrugated washer of a peculiar kind, interposed between the nut and the plate against which the nut is to be applied, and arranged to lock into teeth formed in the inner face or end of the nut, all as hereinafter more fully described.

The invention principally consists in providing the washer with peculiar radial teeth, which engage with the toothed nut, but extend beyond the same, so that they may be readily depressed, and in making the washer undulating between the teeth, so that it will have a spring to render the nut self-tightening under pressure.

In the accompanying drawings, the letter E represents a nut to be secured by our invention. This nut has ratchet-like teeth and notches *l* on its inner face, as shown in Figs. 6, 7, and 8. F is the bolt, screw-threaded to receive the nut E. G is the washer. This washer is perforated to admit the bolt F, and is made undulating around the bolt, as shown in Fig. 2, the undulations being preferably radial to the axis of the bolt. The dotted lines 1, 2, 4, 5, and 7 in Fig. 2 show the points of greatest depression in the undulating plate, and the dotted lines 3, 6, and 8 the points of greatest elevation. The plate or washer G has a flat base, 1 2, so that it may rest on the lower flange of the rail H, and thereby be prevented from turning, or is by any other means prevented from revolving. This undulating washer has two outwardly-raised teeth, *a f*, formed on it, each tooth being practically radial to the axis of the bolt. The said teeth are formed, the one, *a*, by an incision that extends from the central aperture to the outer edge of the washer, and the other, *f*, by an incision that extends from the central aperture outward, but not to the outer edge of the washer, all as shown in Fig. 2. The tooth *a* may, however, also be formed by an incision that does not reach to the outer edge of the washer, as shown in Figs. 11 and 13. The edge of each incision which is opposite the tooth is not bent outward. The nut, when screwed upon the bolt F, bears against the undulating washer G and receives the teeth *a* and *f* in its notches *l*; but the said teeth *a* and *f* are of such length that they extend beyond the sides of the nut. In fastening the nut the teeth will not oppose its rotation. On the contrary, they will spring into the successive notches *l* of the nut as the latter is being turned, but they will prevent the nut being unscrewed, as they bear against the straight sides of the notches, and the nut cannot therefore be unscrewed unless the teeth *a* and *f*, where they project beyond the nut, are first depressed or forced off the nut by a suitable implement applied to that purpose. When these teeth are moved clear off the nut the latter can be unscrewed, but not before. The washer, being thus made springy and self-locking, has this further advantage, that if pressure is applied—say by strain on the rail during the passage of a train—so that the fish-plate I is crowded outward, the tendency will be to flatten the undulating plate G, and in so doing to bring the tooth *a* nearer to the edge 5 of the incision at such tooth, and the tooth *f* nearer to the edge *e* of the other incision. This movement of said teeth will tend to turn the nut tighter, and afterward, when the strain ceases and pressure upon the plate G relaxes, these teeth *a* and *f* will spring back to their normal positions, entering new notches in the face of the nut. Thus, instead of tending to work loose, the nut has the tendency to work itself tight while combined with our improved washer.

The washer need not necessarily be so short that it applies to one bolt only, as in Fig. 2, but it may be made of such length as to receive two or more bolts, as is indicated in Fig. 12, in which case the teeth *a* and *f* are also placed radially to the axis of the bolt and made of such length that they will extend beyond the nut. Nor is it necessary that the undulations should be radial. They may be up and down, as indicated in Figs. 12, 13, and 14.

We do not claim a toothed washer with teeth having inclined biting-edges, as in Patents No. 173,385 and No. 174,175, as such teeth bend inward when force is applied to reverse the nut; nor do we claim an undulating washer, *per se*, as shown in English Patent No. 1,907 of 1876.

We claim—

The spring-washer G, having one or more outwardly-raised radial teeth, *a* and *f*, formed by incisions and bending the washer, said washer being made undulating between said teeth, and constructed so that it cannot revolve, in combination with the ratchet-nut E, the teeth *a f* extending from the central aperture of the washer, and being of such length as to project beyond the nut, substantially as described.

This specification signed by us this 29th day of March, 1881.

LUDG. IMPERATORI.
CARL BÜLOWIUS.

Witnesses:
HERMANN SCHULL,
ADOLF STRUNCH.